(12) United States Patent  
Liu et al.

(10) Patent No.: US 12,073,164 B2  
(45) Date of Patent: Aug. 27, 2024

(54) STENCIL STEP DESIGN METHOD AND SYSTEM, COMPUTER READABLE STORAGE MEDIUM, AND DEVICE

(71) Applicant: VAYO (SHANGHAI) TECHNOLOGY CO., LTD., Shanghai (CN)

(72) Inventors: Jishuo Liu, Shanghai (CN); Jiuxuan Liu, Shanghai (CN); Yongqiang Song, Shanghai (CN); Yongjian Qu, Shanghai (CN); Shengjie Qian, Shanghai (CN)

( * ) Notice: Subject to any disclaimer, the term of this patent is extended or adjusted under 35 U.S.C. 154(b) by 436 days.

(21) Appl. No.: 17/438,895

(22) PCT Filed: Dec. 18, 2019

(86) PCT No.: PCT/CN2019/126332  
§ 371 (c)(1),  
(2) Date: Sep. 13, 2021

(87) PCT Pub. No.: WO2020/186850  
PCT Pub. Date: Sep. 24, 2020

(65) Prior Publication Data  
US 2022/0147684 A1  May 12, 2022

(30) Foreign Application Priority Data

Mar. 19, 2019 (CN) .......................... 201910209598.8

(51) Int. Cl.  
*G06F 30/39* (2020.01)  
*G06F 30/392* (2020.01)  
(Continued)

(52) U.S. Cl.  
CPC .......... *G06F 30/392* (2020.01); *G06F 30/398* (2020.01); *H05K 3/0005* (2013.01); *H05K 3/1225* (2013.01)

(58) Field of Classification Search  
CPC .. G06F 30/392; G06F 30/398; G06F 2119/18; G06F 30/39; H05K 3/0005; H05K 3/1225; H05K 3/3485  
(Continued)

(56) References Cited

U.S. PATENT DOCUMENTS

| 6,321,591 B1 | 11/2001 | Breunsbach et al. |
| 2004/0089413 A1* | 5/2004 | Murphy ............... H05K 3/1225 156/252 |
| 2014/0210993 A1* | 7/2014 | Butler .................. G06V 10/772 348/87 |

FOREIGN PATENT DOCUMENTS

| CN | 102291947 A | 12/2011 |
| CN | 106227946 A | 12/2016 |

(Continued)

*Primary Examiner* — Paul Dinh  
(74) *Attorney, Agent, or Firm* — Global IP Services; Tianhua Gu (57) ABSTRACT

A stencil step design method and system, a computer readable storage medium and a device. The method comprises: acquiring data of stencil apertures for electronic components in a circuit board, and identifying the stencil apertures for electronic components one by one to determine whether the stencil apertures need to be stepped; and if yes, performing step design for the stencil apertures that need to be stepped according to preset step rules corresponding to the stencil apertures for electronic components one by one so as to generate a stencil step design file with the step design, and outputting the stencil step design file. According to the present disclosure, 90% or more steps can be automatically designed and the stencil step design is in conformity with processing requirements. A manual intervention process is omitted, and the design can be accomplished by several simple steps.

9 Claims, 4 Drawing Sheets (51) Int. Cl.
*G06F 30/398* (2020.01)
*H05K 3/00* (2006.01)
*H05K 3/12* (2006.01)

(58) Field of Classification Search
USPC ........................................................ 716/137
See application file for complete search history.

(56) References Cited

FOREIGN PATENT DOCUMENTS

| CN | 106649219 A | 5/2017 |
| CN | 109977518 A | 7/2019 |

\* cited by examiner

STENCIL STEP DESIGN METHOD AND SYSTEM, COMPUTER READABLE STORAGE MEDIUM, AND DEVICE

CROSS REFERENCE TO RELATED PATENT APPLICATION

The present application is the US national stage of PCT/CN2019/126332 filed on Dec. 18, 2019, which claims the priority of the Chinese patent application No. 201910209598.8 filed on Mar. 19, 2019, which application is incorporated herein by reference.

FIELD OF TECHNOLOGY

The present disclosure belongs to the field of electronics manufacturing technology, and relates to a design method and system, in particular, to a stencil step design method and system, a computer readable storage medium and a device.

BACKGROUND

Currently, in the electronics manufacturing industry, stencil steps are all designed by using Gerber files and almost all manually. The specific manufacturing process is as follows.

Step 1: importing a Gerber solder paste layer by Circuit-CAM;

Step 2: based on remarks, identifying by naked-eye inspection which stencil aperture of bonding pad need to be stepped, then manually selecting these apertures and manually drawing step areas by using a graphical tool in software; and Step 3. repeating step 2 until all step design on the corresponding printed circuit board is completed.

It can be seen that the existing manual stencil step design method is very tedious, and if N steps are needed, the same operation needs to be carried out N times, and omissions/errors may occur if the naked-eye inspection is not carried out carefully; furthermore, the above method needs manual calculation of step ranges in the operation process, and an operator needs to perform repeated modifications and confirmations, which requires a relatively high personal ability of the operator. (See FIG. 2 for the specific process).

With the development of electronic products in the industry, the pace of intelligent manufacturing has begun, and the concepts of Industry 4.0, Internet+, and smart factory have entered the entire manufacturing industry. Machining accuracy and design efficiency are increasingly valued by everyone. Thus, an attempt has been made in the industry to seek a method capable of achieving a function of one-click manufacturing of stencil steps.

Therefore, it has become an urgent technical problem for those skilled in the art to provide a stencil step design method and system, a computer readable storage medium, and a device, so as to overcome the shortcomings in the prior art that step ranges need to be calculated manually in the operation process, and an operator need to perform repeated modifications and confirmations, which requires a relatively high personal ability of the operator.

SUMMARY

In view of the above-mentioned shortcomings of the prior art, an object of the present disclosure is to provide a stencil step design method and system, a computer readable storage medium, and a device, to solve the problems in the prior art that step ranges need to be calculated manually in the operation process, and an operator need to perform repeated modifications and confirmations, which requires a relatively high personal ability of the operator.

To achieve the above object and other relevant objects, in an aspect, the present disclosure provides a stencil step design method, including: acquiring data of stencil apertures for electronic components in a circuit board, and identifying the stencil apertures of electronic components one by one to determine whether the stencil apertures need to be stepped; if yes, performing step design for the stencil apertures that need to be stepped according to preset step rules corresponding to the stencil apertures of electronic components one by one so as to form a stencil step design file with the step design, and outputting the stencil step design file; and if not, ending the stepped stencil design and outputting an aperture design file.

In an embodiment of the present disclosure, before the step of acquiring data of stencil apertures for electronic components in a circuit board, the design method further includes: reading a CAD file of the circuit board, converting and saving the CAD file of the circuit board as CAD graphic data, and loading packaging information and associated aperture attribute information in the CAD file to a corresponding CAD component layer; determining whether there is stencil aperture Gerber data corresponding to the CAD graphic data; if yes, calibrating coordinate positions of the stencil aperture Gerber data and the CAD graphic data, and adding the associated aperture attribute information on the CAD component layer to the corresponding stencil aperture of Gerber data to generate a stencil aperture layer; and if not, extracting from the CAD graphic data a stencil aperture solder paste layer to be converted, and generating a corresponding stencil aperture layer.

In an embodiment of the present disclosure, after the step of acquiring data of stencil apertures for electronic components in a circuit board, the stencil step design method further includes: finding whether a stencil aperture database for storing data of stencil apertures has been created in advance; if so, automatically matching a step thickness attribute of the stencil apertures for electronic components in the stencil aperture database; and if not, adding the step thickness attribute to the to-be-stepped stencil apertures in the stencil aperture database.

In an embodiment of the present disclosure, the steps of identifying the stencil apertures for electronic components one by one to determine whether the stencil apertures need to be stepped include: searching for a preset stencil base thickness of the stencil apertures for electronic components according to the step thickness attribute; and based on the preset stencil base thickness, determining whether step thickness values of the stencil apertures for electronic components are equal to the preset stencil base thickness; if so, determining that the stencil apertures for electronic components do not need to be stepped; and if not, determining that the stencil apertures for electronic components need to be stepped.

In an embodiment of the present disclosure, the preset step rules corresponding to the stencil apertures for electronic components one by one include: a step thickness difference of the stencil apertures for electronic components is the preset thickness difference threshold; the distance between the border of a step for an electronic device and a stencil aperture inside the step is within a first preset distance range; and/or the distance between the border of the step for an electronic device and a stencil aperture outside the step is within a second preset distance range.

In an embodiment of the present disclosure, the steps of performing step design for the stencil apertures that need to be stepped according to preset step rules include: calculating step areas of the stencil apertures for electronic components according to the first preset distance range and/or the second preset distance range; adding step text at step centers of the step areas, and the step text including step thickness and step surface information of the stencil apertures for electronic components.

In an embodiment of the present disclosure, after the stencil step design file with the step design is generated, the stencil step design method further includes: detecting in real time whether the generated stencil step design file is qualified; if yes, outputting the stencil step design file; and if not, outputting a modification instruction for the stencil step design file.

In another aspect, the present disclosure provides a stencil step design system, including an acquisition module configured to acquire data of stencil apertures for electronic components in a circuit board; and a processing module configured to identify the stencil apertures for electronic components one by one to determine whether the stencil apertures need to be stepped; if yes, perform step design for the stencil apertures that need to be stepped according to preset step rules corresponding to the stencil apertures for electronic components one by one so as to generate a stencil step design file with the step design, and output the stencil step design file through an output module; and if not, end the stencil step design and output an aperture design file through the output module.

In yet another aspect, the present disclosure provides a computer readable storage medium storing a computer program therein, wherein the computer program, when executed by a processor, implements the stencil step design method.

In yet another aspect, the present disclosure provides a device, including a processor and a memory, wherein the memory is configured to store a computer program, and the processor is configured to execute the computer program stored in the memory so that the device performs the stencil step design method.

As described above, the stencil step design method and system, the computer readable storage medium, and the device described in the present disclosure have the following beneficial effects:

Compared with existing solutions in the industry, the stencil step design method and system, the computer readable storage medium, and the device described in the present disclosure achieve that, according to the present disclosure, 90% or more steps can be automatically designed and the design is in conformity with processing requirements. Manual intervention is omitted, and therefore the design can be accomplished by several simple steps, thereby saving 60%-80% or more of the time needed, and reducing error probability of the stencil step design. In addition, the present disclosure does not have high requirements on skills and knowledge of designers, and can be accomplished by ordinary operators, thus greatly reducing risks for enterprises caused by staff turnover in the corresponding position, and helping the enterprises save labor costs to a degree.

BRIEF DESCRIPTION OF THE DRAWINGS

FIG. 1 (separated as FIG. 1A and FIG. 1B) shows a flow diagram of a stencil step design method of the present disclosure in an embodiment.

REFERENCE NUMERALS

| | |
|---|---|
| 3 | Stencil step design system |
| 31 | Reading module |
| 32 | Processing module |
| 33 | Acquisition module |
| 34 | Output module |
| 4 | Device |
| 41 | Processor |
| 42 | Memory |
| 43 | Transceiver |
| 44 | Communication interface |
| 45 | Communication bus |
| S11-S10 | Steps of a method |

DETAILED DESCRIPTION

Embodiments of the present disclosure will be described below with specific examples, and other advantages and effects of the present disclosure may be easily understood by those skilled in the art from the disclosure in the specification. The present disclosure may also be carried out or applied in other different specific embodiments, and various modifications or changes may also be made to the details in the specification based on different ideas and applications without departing from the spirit of the present disclosure. It is to be noted that the following embodiments and features in the embodiments may be combined with each other if no conflicts will result.

It is to be noted that drawings provided in the following embodiments only schematically illustrate the basic idea of the present disclosure, so the drawings only show components related to the present disclosure, and are not drawn according to the numbers, shapes, and sizes of the components in actual implementation; the forms, numbers, and proportions of the components in actual implementation may represent an arbitrary variant; and the layout of the components may be more complex.

Technical principles of a stencil step design method and system, a computer readable storage medium, and a device provided in the present disclosure are as follows:

PCB CAD data is input. Optionally Gerber files and BOM files are input.

Data such as stencil aperture and aperture thicknesses corresponding to different packaging types are stored.

If a stencil aperture database has been created, the corresponding aperture thicknesses may be acquired by matching the database; if no stencil aperture database is created, first the input CAD data may be organized into a component package list based on component package names, and then a thickness attribute is added to the stencil aperture corresponding to the component package that needs to be stepped.

A stencil base thickness is set in order to identify those apertures that need to be stepped based on the set stencil base thickness. For example, assuming that the base thickness is α, then all apertures with thickness values not equal to a are stencil aperture that need to be stepped, and the corresponding thickness values are step thickness values.

1. Step areas are calculated automatically and design is performed automatically according to corresponding step rules generated based on a stencil design step specification, and if all the rules cannot be satisfied, important rules are selected therefrom for step design.

2. After the design is finished, step text is added at step centers, the step text generally containing step thickness and step surface information.

If steps automatically designed by software cannot meet the requirement, users may design stencil steps by themselves. In this module, not only can conventional steps such as round and rectangular steps be designed, but also shrinking, expanding, rotating, merging and other operations on existing steps can be performed.

After the stepped stencil is designed automatically, stencil apertures are checked automatically and items not met by the steps are listed according to step rules (same as the step rules for automatically designing the stencil), and the steps in the list may be selected to highlight unqualified parts on a drawing.

Stencil processing data is output, for example, as DXF files, Gerber files, or the like.

Embodiment 1

This embodiment provides a stencil step design method, including:

acquiring data of stencil apertures for electronic components in a circuit board, and identifying the stencil apertures for electronic components one by one to determine whether the stencil apertures need to be stepped; and if yes, performing step design for the stencil apertures that need to be stepped according to preset step rules corresponding to the stencil apertures for electronic components one by one so as to generate a stencil step design file with the step design, and outputting the stencil step design file; and if not, ending the stepped stencil design and outputting an aperture design file.

Figure 1A:
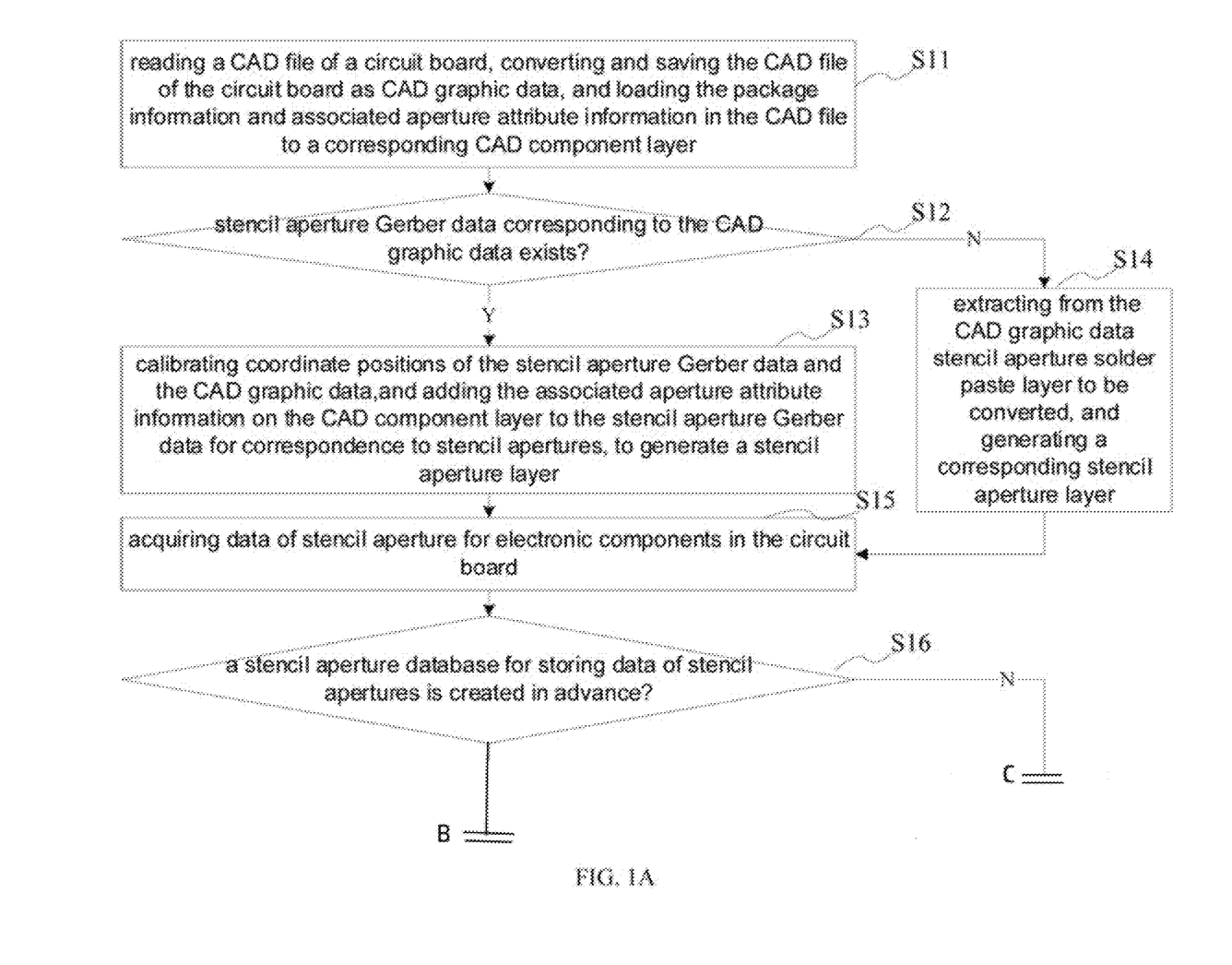
Figure 1B:
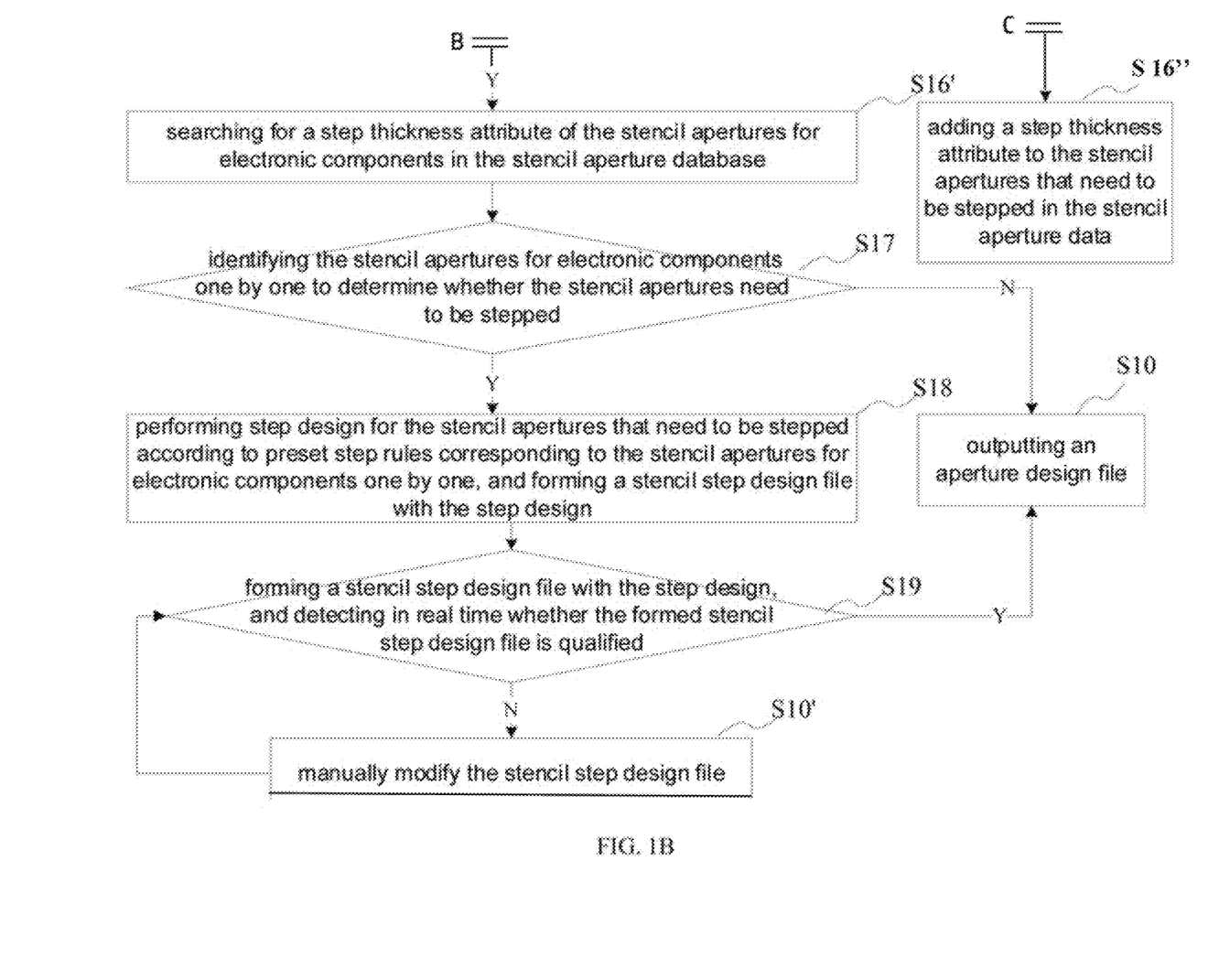

The stencil step design method provided in this embodiment will be described below in detail in conjunction with the drawings. Please refer to FIG. 1, which shows a flow diagram of a stencil step design method in an embodiment. As shown in FIG. 1, the stencil step design method specifically includes the following steps:

S11: reading a CAD file of a circuit board, converting and saving the CAD file of the circuit board as CAD graphic data, and loading the package information and associated aperture attribute information in the CAD file to a corresponding CAD component layer. In this embodiment, by loading the package information and associated aperture attribute information in the CAD file to the corresponding CAD component layer, it can be seen clearly which apertures belong to a same package type when steps are designed automatically.

S12: determining whether stencil aperture Gerber data corresponding to the CAD graphic data exists; if yes, executing S13: calibrating coordinate positions of the stencil aperture Gerber data and the CAD graphic data (in this embodiment, calibrating coordinate positions of the stencil aperture Gerber data and the CAD graphic data means aligning the stencil aperture Gerber data and the CAD graphic data), and adding the associated aperture attribute information on the CAD component layer to the stencil aperture Gerber data for correspondence to stencil apertures, to generate a stencil aperture layer, and proceeding to S15; and if not, executing S14: extracting from the CAD graphic data a stencil aperture solder paste layer to be converted, and generating a corresponding stencil aperture layer, and proceeding to S15.

S15: acquiring data of stencil apertures for electronic components in the circuit board. In this embodiment, the data of stencil apertures for electronic components in the circuit board includes coordinates packaging of the, and material codes S16: searching whether a database for storing data of stencil apertures is created in advance; if yes, executing S16': searching for a step thickness attribute of the stencil apertures for electronic components in the stencil aperture database; and if not, executing S16": adding a step thickness attribute to the stencil apertures that need to be stepped in the stencil aperture data.

S17: identifying the stencil apertures for electronic components one by one to determine whether the stencil apertures need to be stepped; if yes, executing S18; and if not, executing S10: ending the stepped stencil design and outputting an original aperture design file.

Specifically, S17 includes:

automatically matching a preset stencil base thickness of the stencil apertures for electronic components in the stencil aperture database.

based on the preset stencil base thickness, determining whether step thickness values of the stencil apertures for electronic components are equal to the preset stencil base thickness; if yes, determining that the stencil apertures for electronic components do not need to be stepped; and if not, determining that the stencil apertures for electronic components need to be stepped.

For example, the preset stencil base thickness is $\alpha$, and if the step thickness value of the stencil apertures for electronic components is equal to $\alpha$, then the stencil apertures for electronic components do not need to be stepped; if the step thickness values of the stencil apertures for electronic components is not equal to $\alpha$, then the stencil apertures for electronic components need to be stepped.

For example, if the preset base thickness is g, and the step thickness values of the stencil apertures for electronic components are h, then the stencil apertures whose thickness value h is larger than g, need to be thickened with a step thickness difference of h-g, and the stencil apertures whose thickness value h is lower than g need to be thinned with a step thickness difference of g-h.

S18: performing step design for the stencil apertures that need to be stepped according to preset step rules corresponding to the stencil apertures for electronic components one by one, and generating a stencil step design file with the step design. In this embodiment, the preset step rules corresponding to the stencil apertures for electronic components one by one include: a step thickness difference of the stencil apertures for electronic components is a preset thickness difference threshold; the distance between a border of a step for an electronic component and a stencil aperture inside the step is within a first preset distance range; and/or the distance between the border of the step for an electronic device and a stencil aperture outside the step is within a second preset distance range.

Figure 2:
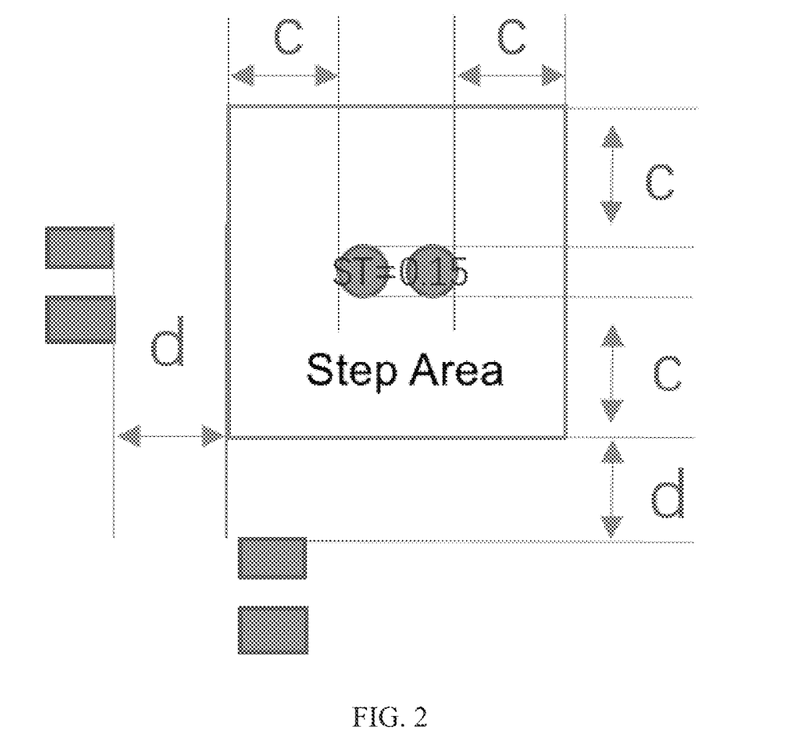
FIG. 2 shows a schematic diagram of an example of a step designed automatically according to preset step rules of the present disclosure.

Please refer to FIG. 2, which shows a schematic diagram of an example of a step designed automatically according to the preset step rules. As shown in FIG. 2, the preset step rules corresponding to the stencil apertures for electronic components one by one require that when a step thickness difference is 0.3, the distance c between a border of a step for an electronic component and a stencil aperture inside the step is greater than e, and the distance d between the border of the step for an electronic component and a stencil aperture outside the step is greater than f (e and f are size values specified in the corresponding preset step rules); in this case, the automatically designed step needs to satisfy c>e, and d>f (c and d represent the actual distances from the step border to the apertures inside and outside the step), and if the two conditions cannot be met at the same time, c>e should be met preferentially.

Step text is added at the step centers of the step areas, and the step text include step thickness and step surface information of the stencil apertures for electronic components.

For example, after the step design is finished, the text ST=0.15 (denoting that the step surface is a scraped face and the step thickness is 0.15) is added automatically.

S19: generating a stencil step design file with the step design, and detecting in real time whether the generated stencil step design file is qualified; if yes, executing S10: ending the stepped stencil design, and outputting the stencil step design file; and if not, executing S10': outputting an instruction to manually modify the stencil step design file, and returning to detect in real time whether the stencil step design file is qualified until it is reported to be qualified. In this embodiment, after a modification instruction is output, an operator manually modifies the stencil step design file by expansion, shrinkage, or manual redesign until the stencil step design file is qualified. In this embodiment, the qualified stencil step design file includes a design file in DXF, Gerber or other formats.

This embodiment provides a computer readable storage medium storing a computer program therein, wherein the computer program, when executed by a processor, implements the above-mentioned stencil step design method.

It may be appreciated by those of ordinary skill in the art that all or some of the steps that implement the method embodiments described above may be accomplished by hardware related to the computer program. The aforementioned computer program may be stored in a computer readable storage medium. The steps including the method embodiments described above are performed when the program is executed; and the aforementioned storage media include an ROM, an RAM, a magnetic disk, an optical disk or any of other various media that can store program codes.

Compared with a current solution in the industry, the stencil step design method described in this embodiment achieves that, 90% or more of the steps can be automatically designed and the design is in conformity with processing requirements. A manual intervention process is omitted, and the design can be accomplished by several simple steps, so 60%-80% or more of the time needed is saved, and the error probability of the stencil step design is reduced. In addition, the method does not have high requirements on skills and knowledge of designers, and can be performed by ordinary operators, thus greatly reducing a risk for enterprises caused by staff changes in the position, and helping the enterprises save labor costs to a degree.

Embodiment 2

This embodiment provides a stencil step design system, including:

an acquisition module configured to acquire data of stencil apertures for electronic components in a circuit board; and a processing module configured to: identify the stencil apertures for electronic components one by one to determine whether the stencil apertures need to be stepped; if yes, perform step design for the stencil apertures that need to be stepped according to preset step rules corresponding to the stencil apertures for electronic components one by one so as to generate a stencil step design file with the step design, and output the stencil step design file through an output module; and if not, end the stencil step design and output an aperture design file through the output module.

Figure 3:
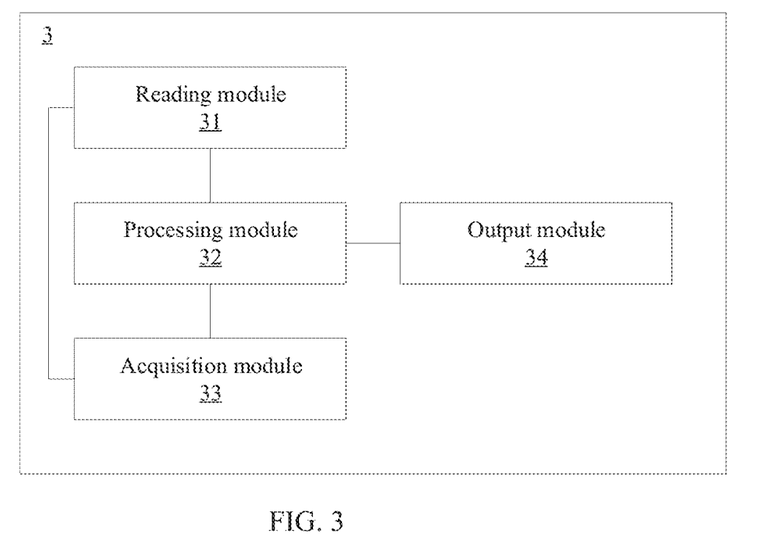
FIG. 3 shows a schematic structure diagram of a stencil step design system of the present disclosure in an embodiment.

The stencil step design system in this embodiment will be described below in detail in conjunction with the drawings. Please refer to FIG. 3, which shows a schematic structure diagram of a stencil step design system in an embodiment. As shown in FIG. 3, the stencil step design system 3 includes: a reading module 31, a processing module 32, an acquisition module 33 and an output module 34.

The reading module 31 is configured to read a CAD file of a circuit board, convert and save the CAD file of the circuit board as CAD graphic data, and load package information and associated aperture attribute information in the CAD file to a corresponding CAD component layer. In this embodiment, by loading the package information and associated aperture attribute information in the CAD file to the corresponding CAD component layer, it can be seen clearly which apertures belong to a same package type when steps are designed automatically.

The processing module 32 coupled with the reading module 31 is configured to: determine whether stencil aperture Gerber data corresponding to the CAD graphic data exists; if yes, calibrate coordinate positions of the stencil aperture Gerber data and the CAD graphic data (in this embodiment, the processing module 32 calibrating coordinate positions means aligning the stencil aperture Gerber data and the CAD graphic data), and add the associated aperture attribute information on the CAD component layer to the stencil aperture Gerber data for correspondence to stencil apertures to generate a stencil aperture layer, and call the acquisition module 33; and if not, extract from the CAD graphic data a stencil aperture solder paste layer to be converted, and generate a corresponding stencil aperture layer, and call the acquisition module 33.

The acquisition module 33 coupled with the reading module 31 and the processing module 32 is configured to acquire data of stencil apertures for electronic components in the circuit board. In this embodiment, the data of stencil apertures for electronic components in the circuit board includes coordinates of the electronic components, packaging of the electronic components, and material codes of the electronic components.

The processing module 32 searches whether a stencil aperture database for storing data of stencil apertures has been created in advance; if yes, automatically matches a step thickness attribute of the stencil apertures for electronic components in the stencil aperture database; and if not, add a step thickness attribute to the stencil apertures that need to be stepped in the stencil aperture data.

The processing module 32 is further configured to: identify the stencil apertures for electronic components one by one to determine whether the stencil apertures need to be stepped; if yes, perform step design for the stencil apertures that need to be stepped according to preset step rules corresponding to the stencil apertures for electronic components one by one and generate a stencil step design file with the step design; and if not, generate a stencil step design file with the step design, and detect in real time whether the generated stencil step design file is qualified; if qualified, call the output module 34 to output the stencil step design file; and if not, output an instruction to manually modify the stencil step design file, and return to detect in real time whether the stencil step design file is qualified until it is reported to be qualified, and call the output module 34 to output the qualified stencil step design file.

The processing module 32 is specifically configured to: search for a preset stencil base thickness of the stencil apertures for electronic components according to the step thickness attribute, i.e., according to the preset stencil base thickness; based on the preset stencil base thickness, determine whether step thickness values of the stencil apertures for electronic components are equal to the preset stencil base thickness; if yes, determine that the stencil apertures for electronic components do not need to be stepped; and if not, determine that the stencil apertures for electronic components need to be stepped.

In this embodiment, the preset step rules corresponding to the stencil apertures for electronic components one by one include: a step thickness difference of the stencil apertures for electronic components is a preset thickness difference threshold; the distance between a border of a step for an electronic device and a stencil aperture inside the step is within a first preset distance range; and/or the distance between the border of the step for an electronic device and a stencil aperture outside the step is within a second preset distance range.

It is to be noted that it should be understood that the division of the modules of the above design system is only a logical functional division, and in actual implementation, all or part of the modules may be integrated into one physical entity, or the modules may be physically separated. Moreover, these modules may be all embodied in the form of software called by a processing component, or all embodied in the form of hardware, or some of the modules may be embodied in the form of software called by a processing component and some of the modules may be embodied in the form of hardware. For example, a module x may be a stand-alone processing component, or may also be implemented by being integrated in a chip of the above-mentioned design system. In addition, the module x may also be stored in the form of program codes in a memory of the above-mentioned design system, being called by a processing component of the above-mentioned design system and performing the function of the above-mentioned module x. The implementation of other modules is similarly. All or part of these modules may be integrated together, or the modules may be implemented independently. The processing component here may be an integrated circuit with signal processing capability. During implementation, the steps of the above-mentioned method or the above modules may be accomplished by an integrated logic circuit in the form of hardware in the processor component or instructions in the form of software. The above modules may be one or more integrated circuits configured to implement the above method, e.g., one or more application specific integrated circuits (ASICs), one or more microprocessors (digital signal processors, DSPs), one or more field programmable gate arrays (FPGAs), or the like. When a module described above is implemented in the form of program codes being called by a processing component, the processing component may be a general-purpose processor such as a central processing unit (CPU) or other processor able to call the program codes. These modules may be integrated together and implemented in the form of a system-on-a-chip (SOC).

Embodiment 3

Figure 4:
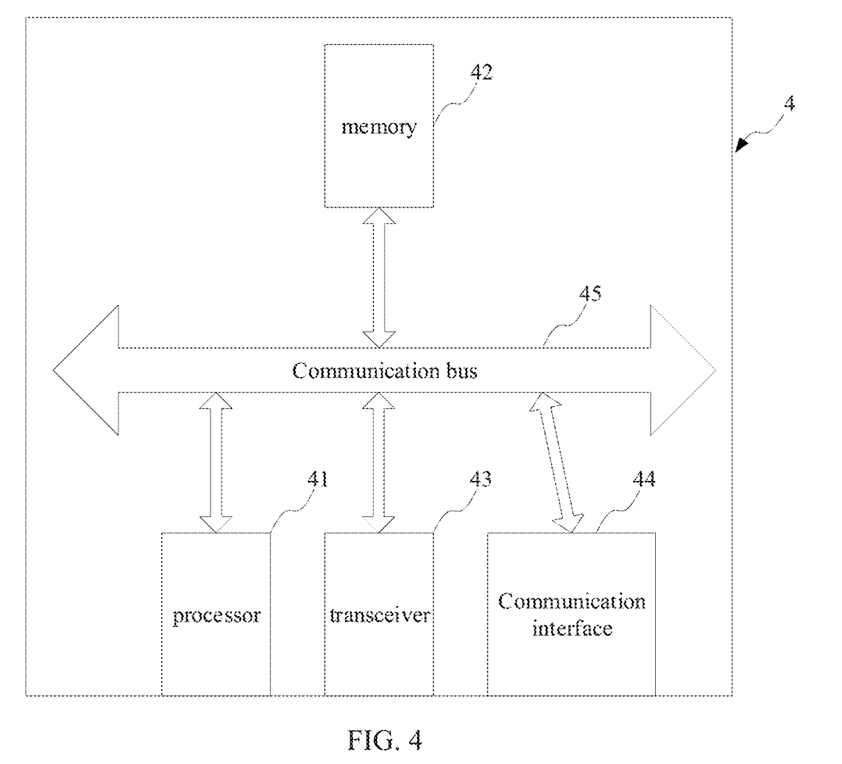
FIG. 4 is a schematic structure diagram of a device of the present disclosure in an embodiment.

This embodiment provides a device. Please refer to FIG. 4, which shows a schematic structure diagram of the device in an embodiment. As shown in FIG. 4, the device 4 includes a processor 41, a memory 42, a transceiver 43, a communication interface 44, or/and a communication bus 45, wherein the memory 42 and the communication interface 44 are connected to the processor 41 and the transceiver 43 through the communication bus 45 to achieve the mutual communication between each other; the memory 42 is configured to store a computer program; the communication interface 44 is configured to communicate with other devices; and the processor 41 and the transceiver 43 are configured to run the computer program so that the device 4 performs the steps of the stencil step design method as described above.

The communication bus mentioned above may be a peripheral component interconnect (PCI) bus or an extended industry standard architecture (EISA) bus, or the like. This communication bus may be divided into address bus, data bus, control bus, and the like. For ease of representation, the bus is represented by only one thick line in the figure, but it does not mean that there is only one bus or one type of bus. The communication interface is configured to implement communication between a database access apparatus and other devices (such as clients, read-write libraries and read-only libraries). The memory may include a random access memory (RAM), and may also include a non-volatile memory, such as at least one disk memory.

The above-mentioned processor may be a general-purpose processor, including a central processing unit (CPU), a network processor (NP), or the like; and may also be a digital signal processor (DSP), an application specific integrated circuit (ASIC), a field programmable gate array (FPGA) or other programmable logic device, a discrete gate or transistor logic device, or a discrete hardware component.

The protection scope of the stencil step design method described in the present disclosure is not limited to the order of execution of the steps listed in this embodiment, and all solutions achieved by adding, reducing, or replacing steps of the prior art according to the principles of the present disclosure are included in the protection scope of the present disclosure.

The present disclosure further provides a stencil step design system. The stencil step design system can implement the stencil step design method described in the present disclosure, but the apparatus for implementing the stencil step design method described in the present disclosure includes, but is not limited to, the structures of the stencil step design system listed in this embodiment, and all structural modifications and substitutions of the prior art according to the principles of the present disclosure are included in the protection scope of the present disclosure.

In summary, compared with current solutions in the industry, the stencil step design method and system, the computer readable storage medium, and the device described in the present disclosure achieve that according to the present disclosure, 90% or more steps can be automatically designed and the design is in conformity with processing requirements. A manual intervention process is omitted, and the design can be accomplished by several simple steps, so 60%-80% or more of the needed time is saved, and the error probability of the stencil step design is reduced. In addition, the present disclosure does not have high requirements on skills and knowledge of designers, and can be accomplished by ordinary operators, thus greatly reducing risks for enterprises caused by staff changes in the position, and helping the enterprises save labor costs to a degree. The present disclosure effectively overcomes various shortcomings of the prior art and has an industrial value.

The above embodiments are merely illustrative of the principles of the present disclosure and effects thereof, and are not intended to limit the present disclosure. Any person skilled in the art can modify or change the above embodiments without departing from the spirit and scope of the present disclosure. Therefore, all equivalent modifications or changes made by those with general knowledge in the technical field without departing from the spirit and technical ideas disclosed in the present disclosure are still covered by the claims of the present disclosure.

What is claimed is:

1. A stencil step design method, comprising:
    acquiring data of stencil apertures for electronic components in a circuit board, and identifying the stencil apertures for electronic components one by one to determine whether the stencil apertures need to be stepped; and
    if yes, performing step design for the stencil apertures that need to be stepped according to preset step rules corresponding to the stencil apertures for electronic components one by one so as to generate a stencil step design file with the step design, and outputting the stencil step design file; and if not, ending the stepped stencil design and outputting an aperture design file;
    wherein after acquiring data of stencil apertures for electronic components in a circuit board, the stencil step design method further comprises:
    searching whether a stencil aperture database for storing data of stencil apertures is created in advance; if yes, automatically matching a step thickness attribute of the stencil apertures for electronic components in the stencil aperture database; and if not, adding the step thickness attribute to the stencil apertures that need to be stepped in the stencil aperture data.

2. The stencil step design method according to claim 1, wherein before acquiring data of stencil apertures for electronic components in a circuit board, the stencil step design method further comprises:
    reading a CAD file of the circuit board, converting and saving the CAD file of the circuit board as CAD graphic data, and loading package information and associated aperture attribute information in the CAD file to a corresponding CAD component layer;
    determining whether stencil aperture Gerber data corresponding to the CAD graphic data exists; if yes, calibrating coordinate positions of the stencil aperture Gerber data and the CAD graphic data, and adding the associated aperture attribute information on the CAD component layer to the stencil aperture Gerber data for correspondence to stencil apertures to generate a stencil aperture layer; and if not, extracting from the CAD graphic data a stencil aperture solder paste layer to be converted, and generating a corresponding stencil aperture layer.

3. The stencil step design method according to the claim 1, wherein the identifying the stencil apertures for electronic components one by one to determine whether the stencil apertures need to be stepped comprises:
    searching for a preset stencil base thickness of the stencil apertures for electronic components according to the step thickness attribute; and
    based on the preset stencil base thickness, determining whether step thickness values of the stencil apertures for electronic components are equal to the preset stencil base thickness; if yes, determining that the stencil apertures for electronic components do not need to be stepped; and if not, determining that the stencil apertures for electronic components need to be stepped.

4. The stencil step design method according to the claim 3, wherein the preset step rules corresponding to the stencil apertures for electronic components one by one comprise:
    a step thickness difference of the stencil apertures for electronic components is a preset thickness difference threshold;
    the distance between a border of a step for an electronic device and a stencil aperture inside the step is within a first preset distance range; and/or
    the distance between a border of a step for an electronic device and a stencil aperture outside the step is within a second preset distance range.

5. The stencil step design method according to the claim 4, wherein the steps of performing step design for the stencil apertures that need to be stepped according to preset step rules comprise:
    calculating step areas of the stencil apertures for electronic components according to the first preset distance range and/or the second preset distance range; and
    adding step text at the step centers of the step areas, the step text comprising step thickness and step surface information of the stencil apertures for electronic components.

6. The stencil step design method according to the claim 5, wherein after the stencil step design file with the step design is generated, the stencil step design method further comprises:
    detecting in real time whether the generated stencil step design file is qualified; if yes, outputting the stencil step design file; and if not, outputting a modification instruction for the stencil step design file.

7. A computer readable storage medium storing a computer program therein, wherein the computer program, when executed by a processor, implements the stencil step design method stated in claim 1.

8. A device, comprising a processor and a memory, wherein the memory is configured to store a computer program, and the processor is configured to execute the computer program stored in the memory so that the device performs the stencil step design method stated in claim 1.

9. A stencil step design system, comprising:
    an acquisition module configured to acquire data of stencil apertures for electronic components in a circuit board; and
    a processing module configured to:
    identify the stencil apertures for electronic components one by one to determine whether the stencil apertures need to be stepped; if yes, perform step design for the stencil apertures that need to be stepped according to preset step rules corresponding to the stencil apertures for electronic components one by one so as to generate a stencil step design file with the step design, and output the stencil step design file through an output module; and if not, end the stencil step design and output an aperture design file through the output module; and
    search whether a stencil aperture database for storing data of stencil apertures is created in advance; if yes, automatically match a step thickness attribute of the stencil apertures for electronic components in the stencil aperture database; and if not, add the step thickness attribute to the stencil apertures that need to be stepped in the stencil aperture data.

* * * * *